United States Patent [19]
Auble et al.

[11] 3,809,870
[45] May 7, 1974

[54] METHOD AND APPARATUS FOR MONITORING CONDITION OF CUTTING BLADES

[75] Inventors: Ronald E. Auble, West Henrietta; Gary J. Kimmet, Rochester, both of N.Y.

[73] Assignee: The Gleason Works, Rochester, N.Y.

[22] Filed: June 8, 1972

[21] Appl. No.: 260,875

[52] U.S. Cl............ 235/151.3, 73/104, 235/151.31
[51] Int. Cl.......................... G01n 3/58, G06f 15/20
[58] Field of Search......... 235/151.3, 150.1, 151.31; 444/1; 340/261, 267; 73/104, 105, 101, 67, 67.2, 67.3; 83/72, 522; 324/77 B, 77 D

[56] References Cited
UNITED STATES PATENTS

| | | | |
|---|---|---|---|
| 3,220,315 | 11/1965 | Mathias..................... | 235/150.1 UX |
| 3,466,431 | 9/1969 | Fuchs et al.................... | 235/151.3 |
| 3,548,648 | 12/1970 | Weichbrodt et al................ | 73/104 |
| 3,694,637 | 9/1972 | Edwin et al...................... | 235/151.3 |
| 3,714,822 | 2/1973 | Lutz............................... | 73/71.4 X |

Primary Examiner—Joseph F. Ruggiero
Attorney, Agent, or Firm—Cushman, Darby & Cushman

[57] ABSTRACT

Method and apparatus for monitoring the condition of a cutter on a cutting machine while it is being used and for indicating when the cutter wear rate has increased sufficiently to economically require removal for replacement and/or servicing. During at least a portion of an actual cutting operation on the machine, the power being consumed by the cutting machine drive motor is monitored and a frequency spectrum of the monitored power consumption is obtained therefrom. At least part of this power consumption frequency spectrum is then integrated to provide a wear rate index value (called a "wear number") which, when compared with previous wear rate index values, may be used as an indication of the relative wear rate for the corresponding cutter. Both an analog embodiment and a combination analog and digital embodiment of apparatus are disclosed for performing the method. To minimize statistical fluctuations, provisions are also made for averaging over several different measurement or sampling periods. An exemplary set of rules is given for processing the wear index values and determining whether or not cutter wear is sufficient to warrant removing the cutter for resharpening and/or other servicing.

31 Claims, 6 Drawing Figures

METHOD AND APPARATUS FOR MONITORING CONDITION OF CUTTING BLADES

This invention relates to method and apparatus for monitoring the condition of cutters in a cutting machine.

Cutting machines driven by electric or other types of motors are often used in shaping blocks of raw material into desired configurations. For instance, most mechanical gears are formed by cutting operations on a metal blank. Sometimes one machine will rough cut the blank into approximately the desired shape while another machine finish cuts the shape to precise dimensions.

Whether metal gears are being cut or some other desired material and/or shape, the cutting machinery is often expensive thus making it imperative that its usage be made as efficient as possible. As those in the art will appreciate, the cutters on such a machine gradually wear away to the point where they must be removed for sharpening, replacement or other servicing.

Of course, the exact rate of wear depends upon many factors including the type of material being cut, the type of material from which the cutters are made, the speed of operation, etc., as will be appreciated by those in the art. However, to make the most efficient possible use of a cutting machine, the cutters should be used until the wear rate reaches some predetermined level at which time the cutters should be removed for replacement and/or servicing.

If the cutters are removed before the maximum allowable wear has occurred, the cutters themselves will not have been used as effectively as possible. In addition, over a period of time, if the cutters are continually removed before they really have to be removed, the cutting machine in question will experience a larger than necessary period of down-time which necessarily occurs during cutter replacement and/or servicing.

On the other hand, if the cutters are allowed to remain on the machine for too long a period of time, then the parts being cut will probably experience greater than acceptable levels of variation in the desired finished dimensions or the cutters may actually break and perhaps damage the workpiece and/or the machine itself.

Accordingly, it is important to be able to monitor the condition of a cutter on such a cutting machine and to obtain an accurate indication of the relative cutter wear rate so that the cutters may be removed for replacement and/or servicing at precisely the optimum time.

It should be noted that the wear rate rather than the absolute value of cutter wear is the most important parameter in deciding when the cutter should be replaced to most economically utilize the cutter and cutting machine. When the rate of wear begins to abruptly increase, the cutter should be removed for re-sharpening and/or other servicing. However, it should be obvious that although the absolute value of wear and the wear rate are both related to cutter condition, it is the wear rate which determines the most economically opportune time for cutter servicing.

An experienced machine operator may be able to "listen" to the sound being emitted during the cutting operation and provide some degree of subjective insight on the condition of the cutters. Obviously, this subjective approach is not a true solution to the problem since the cutters will often be replaced too early or too late depending upon the subjective judgement of the individual observer in each case.

Others have attempted to make this basic "listening" process somewhat more objective by obtaining a frequency spectrum or "signature" of the machine vibrations utilizing an accelerometer mounted upon the machine to transduce the vibrations into an electrical signal from which a frequency spectrum is obtained. According to one such prior art monitoring system, some comparison or ratioing is made between the density of frequencies in the high and low portions of the vibration frequency spectrum to obtain some idea of the cutter condition.

Further, special attention is called to the fact that such prior attempts, where at all successful, have been directed to the monitoring of "single point" cutters (e.g., those used on lathes), and little success has heretofore been achieved in relation to the monitoring of multiple-bladed milling-type cutters such as those utilized in the manufacture of bevel gears.

Now, however, a new technique has been discovered which results in accurate objective monitoring and evaluation of cutter condition in such cutting machinery. In this invention, the cutting process itself is more directly monitored than in other techniques, such as vibration analyses, which relates more to the entire machine's response to the cutting process than to the basic cutting process per se. Utilizing the method and/or apparatus of this invention, a "wear number" may be obtained to provide a relative measure of the wear rate for any particular cutter while it is still in use on the cutting machinery without in any way interfering with the cutting cycle or operation of the machine.

The wear number may be processed in a simple straight forward fashion to obtain an accurate objective indication of whether or not the cutter wear rate has yet reached a value indicating the need for removing the cutter and either replacing it and/or servicing it.

A basic element of this invention involves monitoring the level of electrical or other power being consumed by the motor driving the cutting machinery. If the cutter wear rate becomes too excessive, the power consumption of the drive motor increases rapidly. Unfortunately, this rapid increase in power consumption occurs too late. That is, by the time the rapid increase in the power consumption occurs, the cutter wear has already progressed to such a dangerous point that it is beyond recall and is actually quite close to the point at which the cutter will break. Accordingly, the magnitude of the power consumption by itself cannot be utilized to give an indication of the optimum time for removing the cutters.

However, it has now been discovered that the frequency spectrum of variations in the amount of electrical power being consumed by the drive motor during a cutting operation does in fact relate to the cutter condition. More specifically, it has been discovered that when at least part of the frequency spectrum of the variations in consumed power is integrated (i.e., area under at least part of the spectral response curve(s) in the frequency domain is calculated), a reliable objective index of wear rate (wear number) is obtained. Specifically, it has been discovered that this wear number most usually exhibits a rapid increase in value as the cutter wear rate approaches the optimum time for cutter removal.

In the preferred exemplary embodiment, a wattmeter or other conventional analog power transducer monitors the power being consumed by the drive motor of the cutting machine. This analog signal representing the power consumption is then converted to a digital representation thereof (a series of digital signals representing the magnitude of the power consumption at successive corresponding sample points) by conventional analog-to-digital conversion apparatus. These digital signals are then input to a digital computer or any spectrum analysis equipment which is capable of calculating at least part of the corresponding frequency spectrum of the variation in the magnitude of power consumption. Timing signals are produced from the cutting machine operations to insure that the frequency spectrum is only taken during an actual cutting operation on the machine.

In the preferred embodiment, several successive frequency spectra (N in number) are thus obtained and added together either before or after being integrated within the computer. The frequency spectra are not, of course, necessarily inclusive of all frequency components actually present in the power consumption signal: Rather, a single significant frequency component may be utilized if desired, or a limited bank of the spectra, as will be appreciated. The final summed value or integration may be used directly as the wear number or may be divided by the number N of frequency spectra involved in the calculation to provide an average wear number thus minimizing unavoidable statistical fluctuations in the wear number.

The digital computer or equipment is further programmed in the preferred embodiment to compare this wear index or wear number with just past computed values for this particular cutter and machine and to give an indication of maximum allowable cutter wear rate (and hence optimum cutter removal time) if certain exemplary rules or relationships exist. A print-out may be periodically provided which identifies the machine and cutters needing to be removed.

The analog signal representing power consumption is preferably passed through a low pass filter to supress noise signals which may be present therein or limit the upper frequency as required by the Nyquist criteria. Furthermore, a single digital computer may be utilized on a time sharing basis to monitor a plurality of machines as will be appreciated by those in the art.

While the wear index or wear number has proved to provide reliable indications of cutter wear rate or cutter condition in most cases, when the machine is maladjusted, the wear number may not provide a reliable indication of cutter wear rate. Accordingly, in the preferred embodiment, a "fail-safe" feature is provided to insure that an indication calling for the removal of a particular cutter will occur after a certain maximum number of pieces have been cut by the cutter even though the wear number might not yet indicate the need for such removal. Whenever the fail-safe feature is called into use, this itself is usually an indication of some maladjustment in the cutting machinery involved. That is, when the cutting machinery is properly adjusted in its operation, the wear number usually provides an accurate index of the cutter condition. Accordingly, when the fail-safe feature is utilized, an indication of this fact may be provided and utilized to trigger appropriate adjustments in the correponding machine. Thereafter, the wear number for that machine should also provide a reliable indication of cutter wear so long as it remains in proper adjustment.

A second exemplary embodiment is completely analog in form. An analog signal representing the power consumption of the cutting machine drive motor is obtained as in the previously discussed embodiment. During each monitored cutting operation, this power consumption signal is passed to the inputs of a series of bandpass filters which separate the signal into a series of different frequency components representing the desired range of the frequency spectrum for variations in the power consumption signal. A maximum amplitude signal for each of the different frequency components is then obtained with peak detection circuits, and the signals of all the different peak detectors are added together to provide an analog "wear number" output which is then stored in one or another of a plurality of storage capacitors. As the summed outputs relating to each successive cutting operation being monitored are stored successively in different storage capacitors, each is compared to the outputs which have just previously been stored during immediately preceeding cutting operations. As with the preferred digital embodiment, when a predetermined rate of cutter wear is exceeded, an indication is provided that the cutter needs to be removed. As in the previously discussed embodiment, provisions are made for a fail-safe operation if more than a maximum number of parts have been cut by a particular cutter and other provisions are made to insure that possible spurious responses are ignored.

A more complete understanding of the many advantages and objects of this invention may be obtained from the following detailed description in conjunction with the accompanying drawings, of which.

Figure 1:
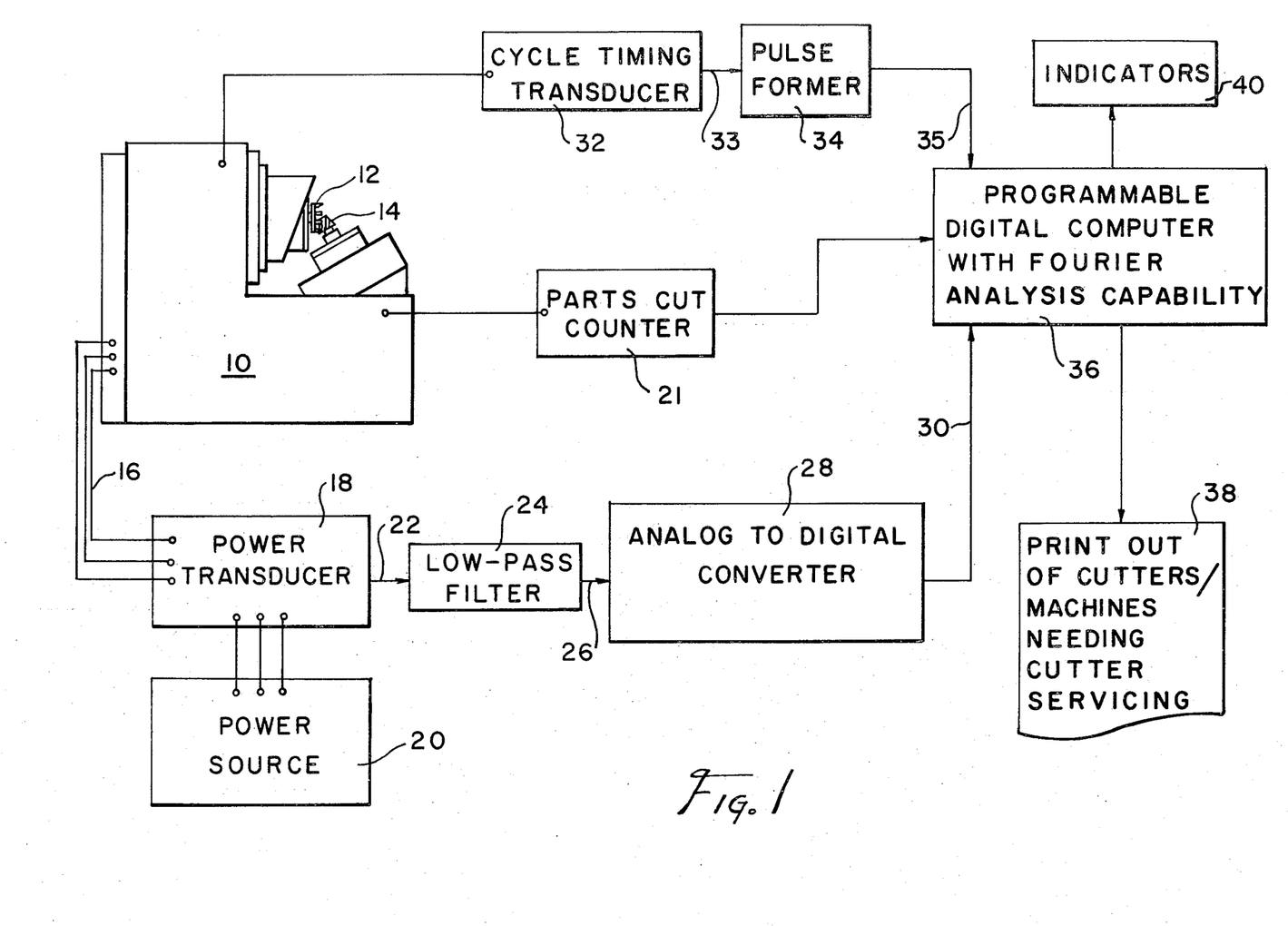
FIG. 1 is a block diagram of a preferred exemplary embodiment of apparatus for using this invention.

FIG. 1 includes a sketch of a typical cutting machine 10. Such machines are in common use today for cutting gear teeth. A plurality of cutters 12 rotate and cut away predetermined portions of a workpiece 14 to form precisely shaped gear teeth thereabout. Those in the art will appreciate that the sketch in FIG. 1 is merely exemplary of one of many different kinds of cutting machines.

The cutting machine 10 is driven by an electric (or other type) motor receiving electrical (or other type) power on lines 16 which may, for example, be three phase electrical circuits as shown in FIG. 1. As the cutters 12 engage the work piece 14, more power is required by the drive motor of the cutting machine. Other fluctuations in the level of power usage are caused by indexing operations, etc., as will be apparent to those in the art. During the actual cutting operation there will be variations in the level of power consumption. It is these variations that are of interest in the process of this invention.

A power transducer 18 is inserted between a power source 20 and the drive motor supply line 16 to monitor the power consumption of the cutting machine drive motor. Power transducer 18 may comprise any conventional form of watt-meter or other transducer measuring the time rate of energy expenditure as should be apparent to those in the art. It may be directly or indirectly connected to lines 16 and produces an analog output signal on line 22 whose instantaneous magnitude represents the power (in watts or the other units) being consumed by the cutting machine drive motor at any given instant of time.

For reasons that will become apparent below, it is also desirable to keep track of the number of parts cut by a cutter. A conventional counter 21 may be appropriately coupled to machine 10 as shown in FIG. 1 to provide digital signals representing this data as will be appreciated.

To insure that relatively high frequency noise components or fluctuations in the power consumption do not unduly influence the cutter condition monitoring scheme to be described in more detail below, a low pass filter 24 is utilized to supress noise signals (and limit the highest passed frequency in accordance with the Nyquist criteria) appearing at its input on line 22 and thus providing an output on line 26 which still comprises an analog signal representing the power being consumed (and the variations therein) at any given instant of time by the cutting machine drive motor.

In the exemplary embodiment low pass filter 24 has an upper cut-off frequency (−3db point) of approximately 50 Hz. However, those in the art will readily appreciate that other filter parameters could also be used so long as any appreciable noise components were supressed. On the other hand, if the system being monitored is such that no appreciable noise signals are being generated, it would, of course, be possible to entirely do away with the low pass filter if that were desired. Alternatively, it would be possible to obtain a complete frequency spectrum including noise components and then simply disregard the higher frequency noise components as should be apparent.

The analog signal on line 26 is converted by an analog-to-digital converter 28 into digital signals on line 30 representing the instantaneous levels of power being consumed by the drive motor. The analog-to-digital converter 28 may be of any conventional form which periodically samples the magnitude of the analog signal appearing at its input on line 26 and generates a corresponding sequence of binary signals representative of that magnitude. As will be appreciated by those in the art, a string of such binary digital signals (which may be either parallel or serial with respect to time) then represents successive samples of the magnitude of the analog input signal and, provided that the sampling frequency is at least twice the frequency of any analog input signal component of interest (commonly called the "Nyquist criteria"), the digital signals will accurately represent all the information content of the analog input signal which is of interest.

As previously mentioned, the power consumption of the cutting machine drive motor will fluctuate from time to time during various parts of the machine cycle such as during indexing, etc. Since this invention is concerned only with monitoring the condition of the cutters 12, some means must be provided for assuring that samples of the power consumption actually utilized in the technique to be described below are only taken during a time period when the cutters 12 are actually engaged with the work piece 14. Accordingly, a cycle timing transducer 32 is coupled with the cutting machine 10 to provide cycle timing signals on line 33 indicative of the different portions of a cutting machine cycle. For instance, in the exemplary embodiment of FIG. 1, cycle timing pulses are produced on line 33 during an initial portion of an actual cutting operation. Cycle timing transducer 32 may comprise any sort of conventional mechanical switches or proximity switches, etc., as should be appreciated by those in the art. Pulse former 34 comprises appropriate differentiating RC circuits and diodes utilized for forming pulses of a desired polarity and timing as the output on line 35 according to standard practices in the art.

Of course, if desired, conventional electronic detecting circuits could be used to detect the cutting time periods 52 (FIG. 2) from other time periods 54, 56 by directly processing the analog power consumption signal. As will be appreciated appropriate cycle timing pulses could thereby be generated without any actual transducer 32, per se.

In the preferred exemplary embodiment of FIG. 1, the digital signals representing the power consumption on line 30 and the cycle timing pulses (indicating the timing of actual cutting operations) are both input to a programmable digital computer 36. The computer 36 may be one of several conventional commercially available types having the ability to provide Fourier analysis of variations in the digital input signals on line 30 thus transforming these signals from the time domain to the frequency domain and for further calculations and operations therwith in accordance with the more detailed description to be given below.

As a final output of the system, a print-out may be provided as at 38 which identifies the machines and cutters which require cutter removal. The print-out 38 may be provided periodically such as the beginning of each workday, etc. As those in the art will appreciate, any desired visual or other humanly sensible indicators 40 might also be provided for each machine cutter and the digital computer 36 could actuate the indicators as soon as cutter servicing is indicated for the corresponding machine and cutter.

Furthermore, those in the art will readily appreciate that using conventional time sharing techniques, the digital computer 36 (and the A-to-D converter 28 and low pass filter 24 if desired) might be utilized for successively monitoring the cutter condition of a plurality of machines. A portion of the memory of the computer 36 would be devoted towards maintaining appropriate records of the past computed wear numbers, etc., of each machine cutter as will become more apparent from the more detailed description given below.

Before providing a more detailed description of the preferred exemplary embodiment shown in FIG. 1, reference will be made to FIGS. 2, 3 and 4 for a more basic explanation of the underlying technique of this invention and to another exemplary embodiment shown in FIG. 5 which is helpful to a basic understanding of the technique of this invention.

Figure 2:
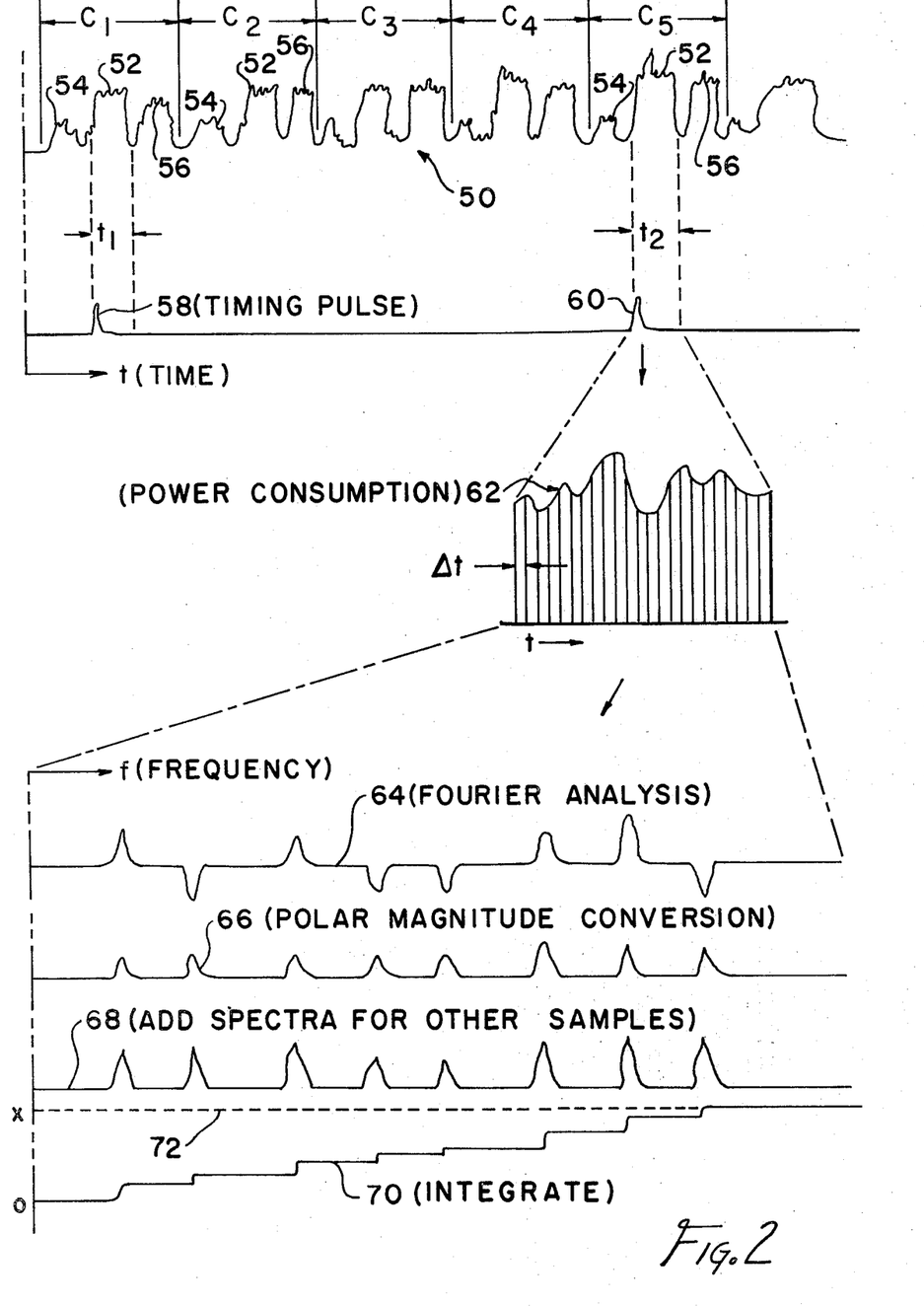
FIG. 2 is a diagram showing various related waveforms useful in explaining the basic process of deriving a wear number according to this invention.

A series of waveforms are shown in FIG. 2 to aid in explaining this invention. The power consumed by the cutting machine drive motor is shown as a function of time at waveform 50. As those in the art will appreciate, waveform 50 is merely exemplary of the type of waveform to be expected from typical cutting machines. As shown in FIG. 2, five actual complete cutting cycles have been depicted and identified as $C_1$, $C_2$, $C_3$, $C_4$ and $C_5$. The actual cutting time for the cutting machine is represented by the central increased level 52 in each of the complete cutting cycle time periods. The preceding increased levels of power consumption 54 and the succeeding increased levels 56 represent power consumption during indexing and/or other machine operations as will be apparent to those in the art.

While the basic technique of this invention is applicable to any given single cutting operation, in the preferred embodiment, several different successive cutting operations are sampled and averaged together to minimize the usual statistical fluctuations to be expected in making such measurements. For example, if the cutting machinery in question is involved in cutting gears having 20 teeth about their circumference, it would be appropriate to monitor the cutting of every fourth gear tooth during cutting of a complete gear and averaging the results to arrive at a final wear number. This procedure would provide five different samplings for any given complete gear cutting operation on the machine.

As shown in FIG. 2, two such samples might be taken during time periods $t_1$ and $t_2$ during which cycle timing pulse signals 58 and 60 are produced respectively. As should be appreciated, the cycle timing pulse signals might just as well be produced during each cutting cycle with appropriate digital counting and logic circuitry being provided external to the actual cycle timing transducer 32 to select out every fourth cycle timing pulse for utilization. Alternatively, the coupling of the transducer 32, to the machine 10 might cause pulse production only every fourth tooth cutting. Those in the art will appreciate that there are many techniques available for producing appropriate cycle timing pulses as desired.

As an example of what happens during each sampled cutting time period, the cycle timing pulse signal 60 will be referenced. Sometime during the actual cutting period $t_2$, a sample such as the 5 second sample of the actual power consumption signal 62 will be selected in response to cycle timing pulse 60. As those in the art will appreciate, signal 62 is in the "time domain," i.e., the abscissa represents time while the ordinate indicates the power consumption which occurs during that time span. The magnitude of the power consumption signal 62 in the time domain will be successively sampled at sample periods $\Delta t$ as shown in FIG. 2. The analog value of the power consumption magnitude at each one of these successive time intervals is then converted into digital signals as previously explained for input to the digital computer.

As those in the art will appreciate, if the analog-to-digital converter 28 is continuously connected as shown in FIG. 1, the actual analog-to-digital conversion of the power consumption signal 62 will be a continuous process; however, appropriate gating signals will be generated by the cycle timing pulse signals on line 35 to gate an appropriate short sample (such as the 5 second sample shown in FIG. 2) during an actual cutting operation.

The digital signals representing the sampled power consumption signal 62 are subjected to conventional Fourier analysis techniques and the variations of power consumption are converted to the "frequency domain" as shown at 64. That is, as those in the art will appreciate, the abscissa of Fourier analysis curve 64 represents increasing values of "frequency" (as different from "time"), while the ordinate represents the real and/or imaginary coefficients of the power consumption component which occurs at that particular frequency. Conventional Fourier analysis techniques may result in both positive and negative real and imaginary magnitudes for each of various frequency components as shown in curve 64. By taking the square root of the sum of the squares of the real and the imaginary parts of each frequency component, a polar magnitude conversion is effected to result in positive absolute magnitude for each of the frequency components as shown by curve 66 in FIG. 2.

Alternatively, various modifications may be made in the exemplary mathematics. For instance, the conversion step to polar magnitudes may be unnecessary in certain instances. One or more particular spectral response peaks may be summed, or limited ranges of the frequency spectrum may be integrated, or particular signals can be smoothed out by interval Hanning (a mathematical operation of weighting each data point as a function of neighboring data point values), etc., as will be appreciated by those in the art.

If the averaging technique previously discussed for minimizing statistical fluctuations is not to be utilized, then the frequency spectra shown at 66 might be integrated directly according to the techniques of this invention to obtain a wear number. However, when the averaging technique previously discussed is to be utilized, the frequency spectrum 66 will be stored away in the computer and added to the spectra derived from other N-1 samples where N represents the number of samples to be average. (In the example previously discussed about a 20 tooth gear where sampling is effected every fourth gear tooth, N would equal 5.) The summation of such spectra for N samples is shown at 68 in FIG. 2. Of course, if desired each separate spectrum could be integrated to provide a preliminary wear number with the N resulting preliminary wear numbers being averaged to obtain the same end result.

Still in the frequency domain, the summed spectra at 68 is integrated as shown at 70 to result in a final digital value $x$ as shown by level 72 in FIG. 2. The value $x$ divided by N is then equal to the average wear number or wear index.

As will be discussed in more detail below, the wear number or wear index $x/N$ is then processed appropriately to result in an indication of whether or not the machine cutter corresponding thereto needs removal.

Figure 3:
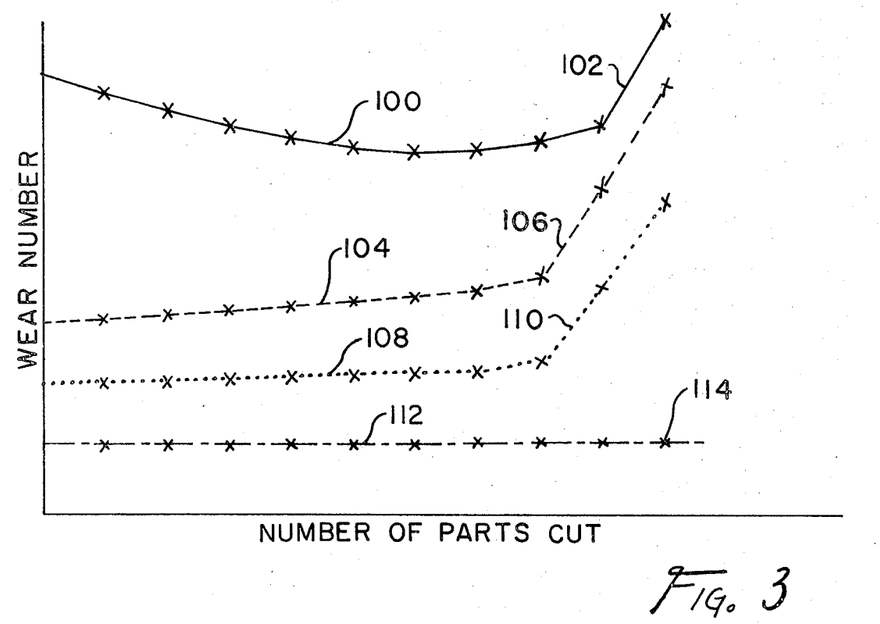
FIG. 3 is a graph of the wear number versus the number of parts cut for several different typical cutting machines.
Figure 4:
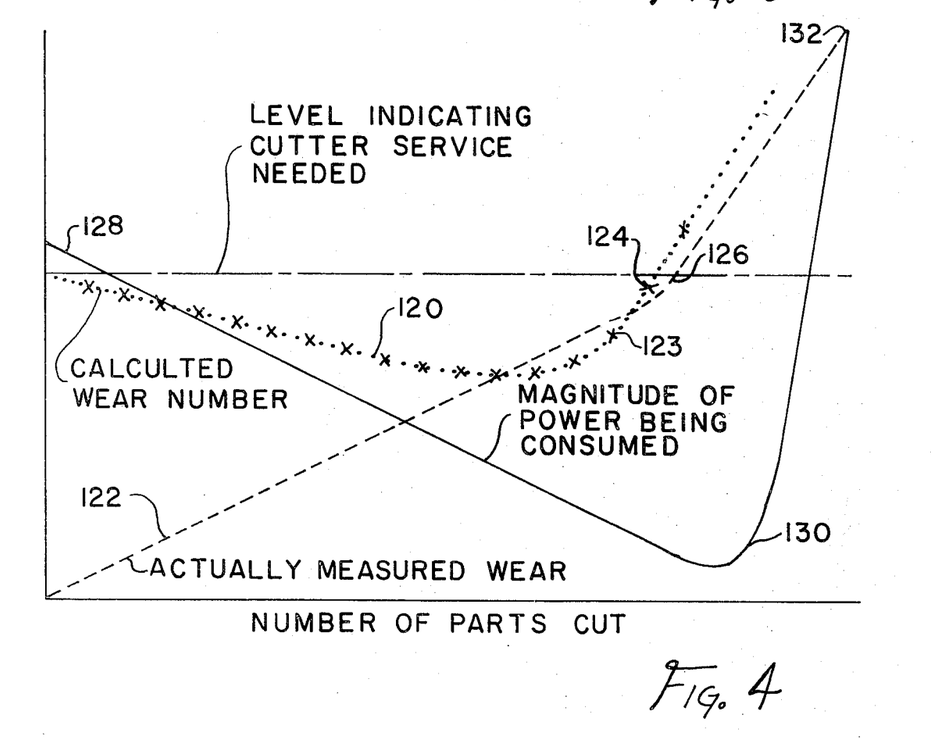
FIG. 4 is a graph comparing the actual measured cutter wear and the calculated wear number as well as a curve of power consumption all as functions of the number of parts cut by a given cutter.

Typical variations in the wear number (ordinate) versus the number of parts cut by a given machine cutter (abscissa) are shown in FIG. 3. In a first wear number function 100, the wear number first decreases slightly and and then abruptly increases as shown at 102. The abrupt increase at 102 is a signal indicating the optimum time for cutter removal. The wear number waveform shown at 104 is a function where the wear number gradually increases and then much more abruptly increases as shown at 106. The abrupt increase at 106 is again a signal indicating the optimum time for cutter removal.

The function shown at 108 is one where the wear number remains substantially constant and then rapidly increases as shown at 110. Again, the rapid increase at 110 is an indication of the optimum time for cutter removal.

For cutting machines properly adjusted and normally operating, the three curves 100, 104 and 108 are generally typical of the kind of curves to be expected. However, for machines having certain misadjustments (i.e., feeding speeds, cutting speeds, relative orientation of the work piece and cutters, etc.), it is sometimes possible for the wear number to continue at a substantially unchanged value as shown at 112 or at least to fail in providing the expected rapid increase which otherwise serves as a signal to indicate the optimum time for cutter removal. As will be explained in more detail below, in this case, a "fail-safe" procedure will still result in an indication at point 114 that the cutter should be removed even if the expected abrupt increase is not encountered.

The effectiveness of the invention herein is best exemplified by a comparison in which a particular cutter is monitored both by means of the "wear number" method disclosed herein as well as by means of actual wear measurements. FIG. 4 shows such a comparison in which both actual measurements and calculations are made at regular intervals during the cutting of successive parts. Plotted along an abscissa scaled in "number of parts cut," the calculated wear rate results in a typical wear number function 120, while actually measured wear is shown as curve 122. In the manner referred to above, when the rate of change between successively calculated wear numbers (slope of curve 120) suddenly increases, as between points 123 and 124, the intervention herein will indicate the need for cutter removal.

It is known that when the actually measured wear rate (slope of curve 122) suddenly increases (represented at 126), the cutter needs to be removed, and it should be noted that point 126 is very close to the cutter removal point 124 which is indicated by the calculated wear number function 120 previously described. Accordingly, by following the indication of cutter removal at 124 provided from the calculated wear number function 120, a very close approximation to the actual optimum replacement point 126 may be achieved.

Particular attention is called once again to the fact the wear number calculated according to the invention herein, while derived from the power being consumed during cutting operations, provides a result surprisingly different than would be achieved if power consumption alone were used. This can be readily observed from FIG. 4 by comparing calculated wear number curve 120 with curve 128 which is a plot of the average magnitude of the power actually being consumed during cutting operations versus the number parts cut. As can be seen, the magnitude of the power actually being consumed decreases as the actual cutter wear (curve 122) increases and is still in fact decreasing when the optimum time for cutter removal occurs. It is only considerably subsequent to the optimum removal time when the magnitude of the power being consumed very suddenly increases (as at 130) and almost instantly reaches a point (such as 132) where the cutter rapidly deteriorates and breaks. Accordingly, it will be appreciated that the magnitude of power consumption (curve 128) cannot itself be utilized directly to indicate the need for cutter replacement and/or servicing since any change in the overall magnitude of power being consumed occurs much too late to permit optimum removal of the cutters.

Figure 5:
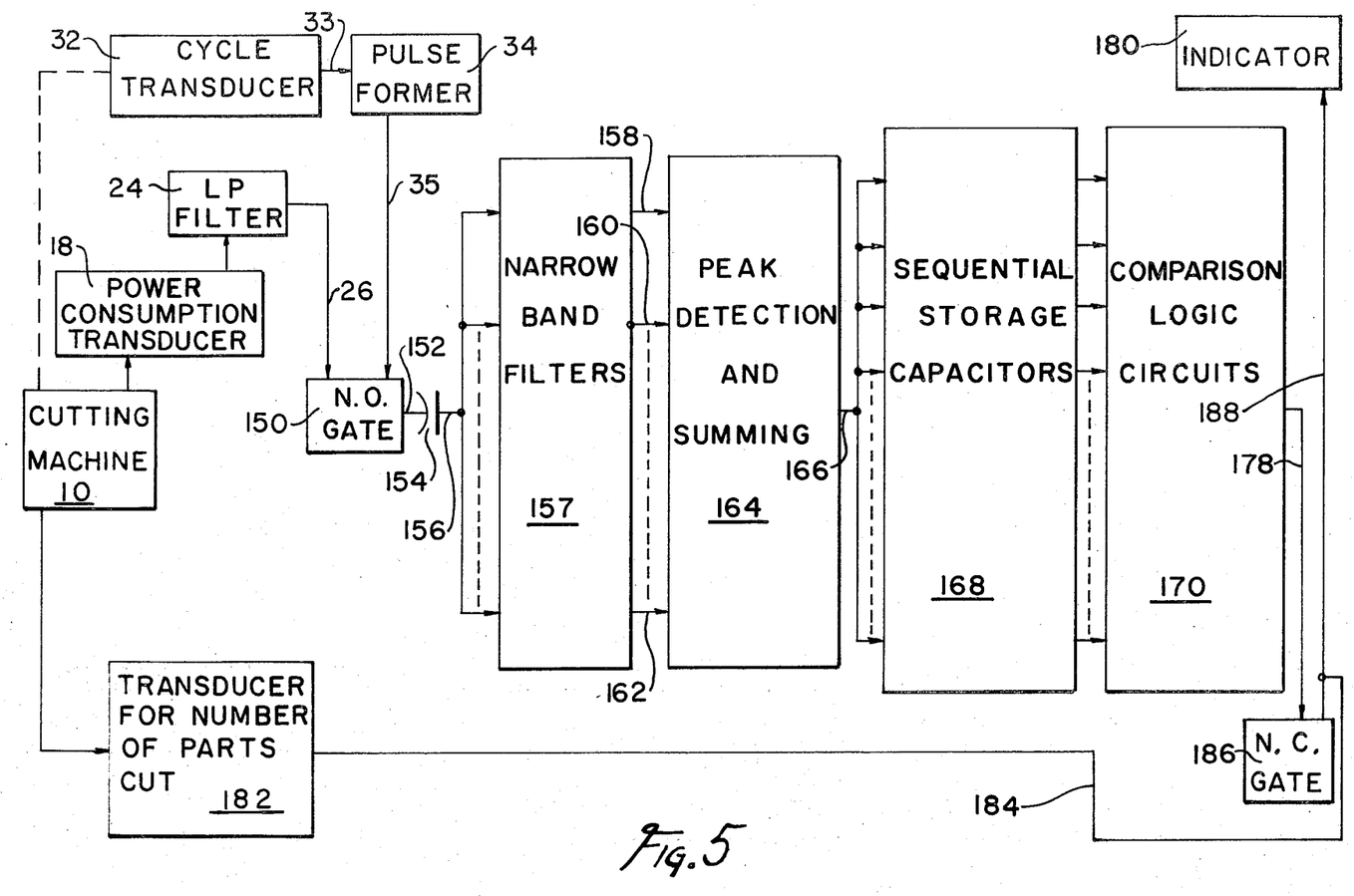
FIG. 5 is a block diagram of another exemplary embodiment of apparatus for using this invention.

An exemplary analog embodiment of this invention is shown in FIG. 5. The cutting machine 10, cycle transducer 32, pulse former 34, power consumption transducer 18 and low pass filter 24 are the same as already described with respect to FIG. 1. Now, a "normally open" gate means 150 normally blocks the analog signal on line 26 representing the instantaneous power consumption of the cutting machine drive motor. However, during actual gear cutting operations, the cycle transducer 32 provides a cycle reference pulse on line 35 which closes gate 150 and permits the analog power consumption signal on line 26 to pass therethrough to the output 152. As will be appreciated, the cycle timing pulses can be lengthened appropriately by the pulse forming circuitry in various manners well known in the art.

The AC portion of this gated analog signal is then passed by an AC coupling capacitor 154 which blocks the DC component since it is of no substantial interest and would only serve to degrade the desired frequency analysis of the variations in the analog signal as should be apparent to those in the art.

The AC component of the instantaneous power consumption of the cutting machine drive motor on line 156 (during a cutting operation) is then simultaneously input to a series of band pass filters 157. Each of the band pass filters is designed to pass a narrow band of frequencies with the center frequency of each band successively increasing from one filter to the next so as to effectively cover the entire spectrum of interest (typically one through 50 Hz).

The plural outputs on lines 158, 160 ... 162 thus represent the desired frequency spectrum of the variations in the analog power consumption signal.

Peak detection and summing circuitry 164 first determines the maximum amplitude of each of the signals passed by the various filters and then adds all of the maximum amplitude signals to provide an output on line 166 which comprises the analog equivalent to the "wear number" just discussed above in relation to the preferred digital embodiment.

It will be appreciated that for each cutting operation being monitored an appropriate analog "wear number" output appears on line 166, and as each successive output appears, it is sequentially stored in one or another of a bank of storage capacitors 168. As each successive "wear number" output is received into a storage capacitor, logic circuits 170 compare it with the outputs which have just previously been stored during the monitoring of immediately preceeding cutting operations. Logic circuits 170 operate in the same general manner as the preferred digital computer program referred to above (which is explained in detail below.) In brief, whenever the rate of cutter wear suddenly increases, as indicated by a comparison of the stored analog "wear number" outputs, logic circuits 170 provide an appropriate signal on line 178.

The signal from logic circuits 170 on line 178 could be used to directly drive a humanly sensible indicator 180 (such as a light, a print out device, etc.) to give an indication of the optimum time for a machine cutter to be removed. However, to provide both a fail-safe feature and to prevent possible spurious responses, it is desirable that the output of level detector 174 be slightly modified before driving the indicator 180.

As shown in FIG. 5, the cutting machine 10 also includes a transducer means 182 which provides a signal indicative of the accumulated number of parts cut by a given cutter. Conventional transducers, digital counters and logic circuitry may be included with the transducer means 182 to provide a signal on line 184 if more than some $x_1$ parts (for instance approximately 125 percent of the expected cutter life) have been cut by any given cutter thus indicating that a fail-safe response should be generated since it is probable that a wear number function such as 112 shown in FIG. 3 is occurring. Accordingly, the signal on line 188 is connected to directly drive the indicator 180 to indicate the need for removal of the corresponding cutter.

As with the preferred exemplary embodiment shown in FIG. 1, the embodiment shown in FIG. 5 may also be time shared with several different cutting machines.

Having now discussed the basic techniques of this invention with respect to the explanator waveforms of FIGS. 2 through 4 and the exemplary analog embodiment of FIG. 5, the preferred exemplary embodiment employing the programmable digital computer as shown in FIG. 1 will now be explained in more detail.

The power transducer 18, low pass filter 24, analog-to-digital converter 28 and cycle timing transducer 32 have all been previously explained and should now be clearly understood by those in the art.

In one form of the exemplary embodiment of FIG. 1, the A-to-D converter 28 and programmable digital computer 36 comprise a conventional Fourier analyzer and small digital computer typical of many such devices now commercially available. For instance, the Fourier Analyzer Model No. 5452A available from the Hewlett Packard Corporation may be utilized in conjunction with the Hewlett Packard Model No. 2114B computer (with 8,192 word memory) to realize both the A-to-D converter 28 and programmable digital computer 36 as shown in FIG. 1. Complete technical data descriptions of these machines and conventional techniques for programming the computer (FORTRAN, BASIC and ALGOL compilers are available as well as assembly level compilers) and/or for connection with appropriate input/output devices is commercially available from the Hewlett Packard Corporation and/or other corporations offering similar conventional equipment.

Based upon several experimental tests, several exemplary rules have been developed for evaluating the waveforms or wear number functions to be expected as shown in FIG. 3 and for deciding whether or not an indication of the optimum time for cutter removal should be given.

During these tests, each wear number was obtained by averaging 32 samples together where eight samples were taken per part over four consecutive parts to thus minimize statistical fluctuations. The following three rules are merely exemplary of the type of rules that may be formulated for evaluating the wear number functions such as shown in FIG. 3. Those in the art will appreciate that many other kinds of rules could obviously be devised depending upon the particular kind of wear number functions to be expected from particular machines in particular cutting operations, the frequency with which wear numbers are evaluated, etc.

Rule No. I — Indicate the need for cutter removal if the current just computed wear number exceeds the just previous computed wear number by 5 percent. Here again, the 5 percent could obviously be changed if the wear number evaluation points are taken at shorter or longer sampling intervals. Furthermore, the exact percentage figure may be changed depending upon the kind of cutting machinery, etc., involved. Basically, this rule is designed to detect an abrupt increase in the wear number as shown for instance at points 102, 106, and 110 in FIG. 3 thus indicating the need for cutter removal.

Rule No. II — Remove the cutter if the current just computed wear number exceeds any of the three just previously computed wear numbers of 10 percent. Here again, the 10 percent could obviously be changed depending upon the frequency with which the wear points are evaluated, etc. Again, this rule is designed to detect a rapid increase in the wear number function and more specifically, is designed to detect this increase in spite of statistical fluctuations such as might occur with greater incidence when fewer numbers of samples are averaged in constructing each single wear number as should be apparent to those in the art.

Rule No. III — Indicate the need for cutter removal if the accumulated parts cut count exceeds the current expected cutter change point plus 25 percent. Of course, the 25 percent figure can be changed with the increased experience factors. Basically, this rule represents the fail-safe rule which involves forcing an indication of the need for cutter removal regardless of the wear number function behavior if the actual number of parts cut exceeds some fail-safe point.

Figure 6:
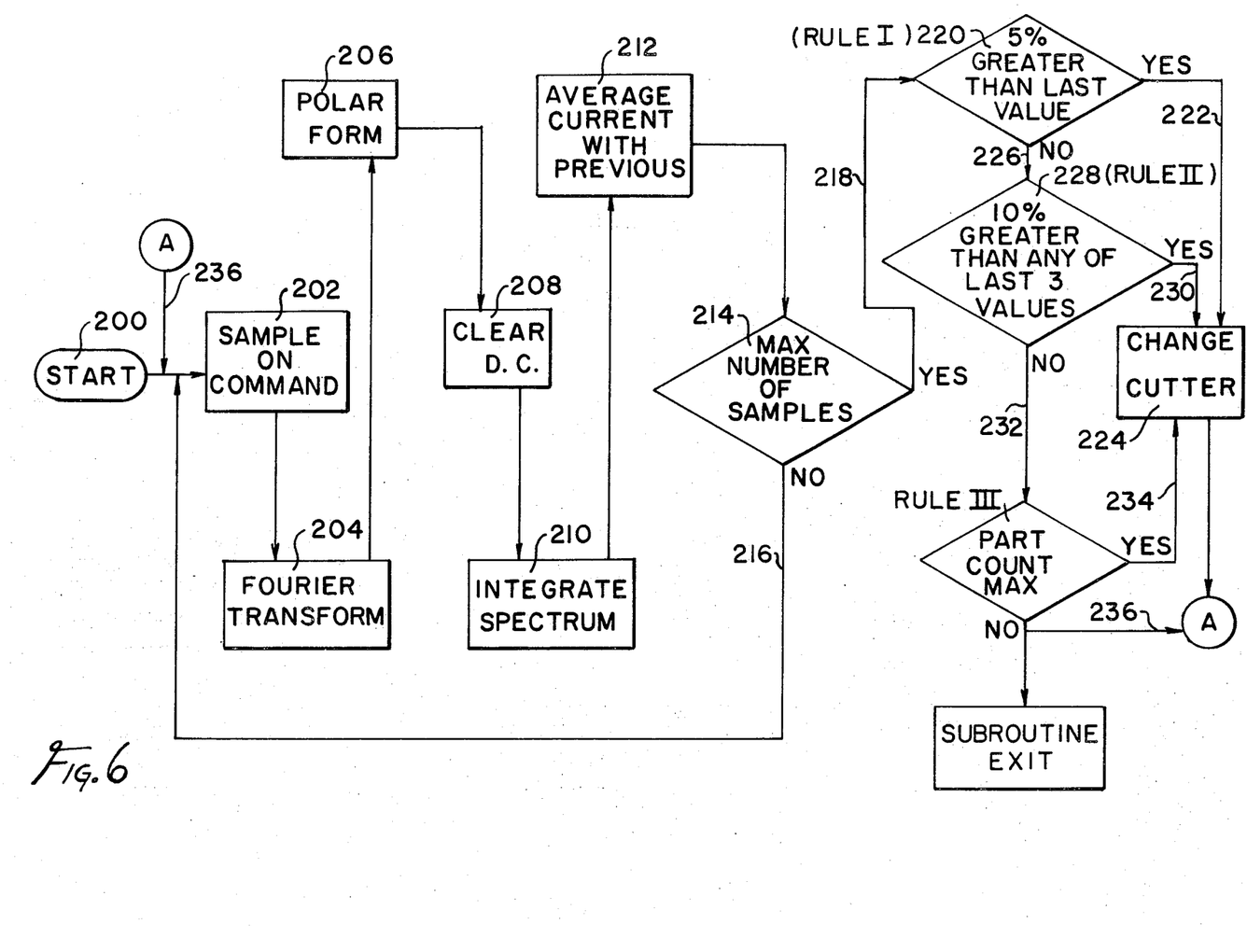
FIG. 6 is a block diagram of an exemplary computer program module for use with the preferred embodiment of this invention as shown in FIG. 1.

A flow chart for a typical exemplary computer program module designed to perform the various steps indicated in FIG. 2 is shown in FIG. 6. Initialization and starting of the digital computer and the analog-to-digital converter is represented at 200 in FIG. 6. The computer is programmed conventionally to take a predetermined number of samples of the digital power consumption signals at 202. Typically, the samples are taken on command from the cycle timing pulse on line 34 which triggers sampling at some standard rate such as 50 or 100 Hz as required by the Nyquist criteria. A predetermined number of samples such as 256 or 512 are taken at this frequency thus representing some predetermined sample period such as approximately 5 seconds. Those in the art will readily appreciate that different sampling frequencies and/or different numbers of sampling points might also be utilized.

At 204, a standard or conventional Fourier transform technique is employed to process the digital information obtained at 202 and to produce digital signals representing the frequency components of the analog input in the frequency domain such as shown schematically at 64 in FIG. 2.

As those in the art will appreciate, the standard Fourier analysis techniques result in positive and/or negative real and imaginary parts for components at any given frequency. By utilizing the standard technique for obtaining the absolute magnitude of any given frequency component (i.e., the square root of the sum of the squares) a polar magnitude form of the frequency spectrum is obtained at 206. In this form, each frequency component can be represented as $C_n \exp(jw_n t)$ according to usual conventions where $C_n$ is the polar magnitude of the component at $w_n$ frequency.

Since the DC components are of no particular interest and since their presence would only complicate and degrade the final "wear number," the first two components encountered in the spectrum are set to 0 at 208 to thus remove any DC components from the spectrum and eliminate any degrading influence that such components might have. Of course, the removal of the DC components such as at 208 in FIG. 6 was accomplished by the AC coupling capacitor 154 in the analog embodiment of FIG. 5.

The resulting spectrum (or any desired portion thereof) is then integrated at 210 and averaged at 212 with any previous integrated corresponding spectra obtained for this particular machine and cutter during the cutting cycles monitored in the course of cutting successive teeth on one particular workpiece. Typically, after the spectrum is integrated, the last point of the integrated spectrum is added to the sum of the last point previously collected and stored for subsequent averaging. Of course, if the same number of samples are used for calculating all wear numbers, the step of actually dividing by the number of samples to obtain the average "wear number" is not necessary since all the wear numbers would be divided by the same number anyway as should be apparent.

The number of samples to be taken is of course a parameter that must be specified by some input information to the computer either separately for each run or when the program itself is written as will be appreciated by those in the art. The number of samples taken is compared to this maximum number (N) of samples at 214. If less than the maximum number N of samples has been taken, a branch is taken along 216 back to a sampling on command instruction at 202 where all the procedures 202, 204, 206, 208, 210 and 212 are repeated as should be apparent. Finally, the maximum number of desired samples will have been taken and a branch will be taken along line 218.

From previously calculated wear numbers (which have of course been stored in appropriate assigned storage locations within the computer 36) the newly computed wear number will be processed according to previously discussed exemplary rules I, II, and III or according to any other appropriate set of rules as should be apparent to those in the art.

For instance, as shown in FIG. 6 the currently calculated wear number is compared with the last value of the wear number at 220. If the current number is 5 percent greater than the computed just previous value, then according to Rule I cutter removal should be indicated and a branch is made along 222 to an appropriate output instruction at 224 which generates a print-out indicating the identification of the machine and the cutter thereon which is now due for removal.

If the current wear number does not pass the Rule I test for indication of cutter removal, a branch is made along 226 to another comparison corresponding to Rule II at 228. Here, the current just calculated war number is compared to any of the last three computed wear number values and if the current wear number is 10 percent greater than any of the last three values, a branch is made along 230 to the same cutter removal output instruction 224. On the other hand, if the wear number is not 10 percent greater than any of the last three values, a branch is made along 232 to a further comparison or processing of the wear number according to Rule III. Here, the current number of parts cut for the corresponding cutter or part count is compared to a predetermined maximum value (such as 125 percent of an expected maximum). If the part count has been exceeded, a branch is made along 234 to the cutter removal output instruction 224 and, if not, a branch is made along 236 back to the sample on command instruction 202.

As will be appreciated by those in the art, the program module shown in FIG. 6 is actually a closed loop sub-routine for continuously calculating wear numbers. Of course, by branching at indicated point "A" to a subroutine exit, the sub-routine might be utilized only once for a given machine and cutter and then appropriately re-entered from a master control program to cause the next entry to the sub-routine to result in calculation of a wear number for the next machine and cutter, etc., until all the machines in a given set of machines have been sampled and wear numbers calculated and stored therefor.

By continuously and cyclically sampling and calculating wear numbers and storing them on such a time sharing basis, a single computer 36 can thus be utilized for compiling wear number statistics (and thus effectively the wear number functions such as those shown in FIG. 3) for each machine in a set of machines. Appropriate print-outs and/or other indications may be given whenever the wear number functions indicate the need for cutter removal and/or a fail safe indication is to be given as should now be apparent.

Of course, if desired, conventional digital logic apparatus could be assembled in a small special purpose computer where the "program" is wired in or otherwise stored permanently to achieve the process techniques of this invention.

Furthermore, when a fail safe branch is taken along 234 in FIG. 6, another print-out indication could be given if desired to indicate that the corresponding machine is out of adjustment and should be looked at with regard to readjustments such that the wear number function again corresponds to the appropriate shape. That is, as previously indicated, when the wear number fails to abruptly increase as shown in FIG. 3, this in itself can be taken as an indication of some maladjustment in the machinery corresponding thereto.

While only a few embodiments of this invention have been specifically described in this specification, those in the art will readily appreciate that many minor modifications, substitutions, etc., may be made in the disclosed exemplary embodiments without in any way materially departing from the spirit of the invention or from the advantages and objects explained above. Accordingly, all such modification and/or substitutions are intended to be included within the scope of this invention.

What is claimed is:

1. A method for automatically monitoring the condition of cutters on a cutting machine which is driven by a driving motor, said method comprising the steps of:

producing an electrical signal representative of the power being consumed by said motor during at least part of a cutting operation on said cutting machine, automatically machine processing said electrical signal to derive a frequency spectrum therefor, and automatically machine integrating at least part of said frequency spectrum to automatically produce a wear index value output indicative of the condition of the cutters being used by said cutting machine.

2. A method as in claim 1 further comprising, after said producing step, the step of substantially filtering out of said electrical signal, all frequency components in excess of a predetermined frequency range.

3. A method as in claim 2 wherein said predetermined frequency range of said electrical signal comprises 1–50 Hz.

4. A method as in claim 1 further comprising the step of blocking the D.C. component of said electrical signal before said automatic machine processing step.

5. A method for monitoring the condition of cutters on a cutting machine which is driven by a driving motor, said method comprising the steps of:

producing a signal representative of the power being consumed by said motor during at least part of a cutting operation on said cutting machine, processing said signal to derive a frequency spectrum therefor, and integrating at least part of said frequency spectrum to produce a wear index value indicative of the condition of the cutters being used by said cutting machine, said producing step comprising generating an analog signal representative of the power being consumed by said motor, and processing said analog signal with an analog-to-digital converter to produce digital signals representative of the magnitude of power being consumed by said motor at successive discrete time intervals during at least part of a cutting operation on said cutting machine.

6. A method as in claim 5 wherein said processing step comprises:

digitally computing a Fourier transform using said digital signals to provide a digitally valued frequency spectrum of the power being consumed by said motor.

7. A method as in claim 6 wherein said integrating step comprises:

digitally integrating said digital valued frequency spectrum to produce a digital wear number indicative of the condition of said cutter.

8. A method as in claim 7 further comprising the steps of:

comparing the just computed said digital wear number to at least one previously computed wear number value to detect when the cutters need to be removed for servicing.

9. A method as in claim 8 further comprising:

comparing the number of parts which have been cut by said cutters to a predetermined maximum fail-safe number to indicate a need for cutter removal if said maximum fail-safe number has been exceeded even though said wear-number may not indicate such need.

10. A method for monitoring the condition of cutters on a cutting machine which is driven by a driving motor, said method comprising the steps of:

producing a signal representative of the power being consumed by said motor during at least part of a cutting operation on said cutting machine, processing said signal to derive a frequency spectrum therefor, and integrating at least part of said frequency spectrum to produce a wear index value indicative of the condition of the cutters being used by said cutting machine, said producing step comprising generating an analog signal representative of the power being consumed by said motor during at least part of a cutting operation on said cutting machine, passing said analog signal through a low pass filter, effectively blocking said analog signal during other than said cutting operations if it is then being produced, and effectively blocking any D.C. component of said analog signal to produce an output signal representing only the significant A.C. components of variations in the power being consumed by said motor during a cutting operation on said cutting machine.

11. A method as in claim 1 wherein said automatic machine processing step comprises:

automatically performing an apparatus generated frequency analysis of said signal to automatically determine which frequency components are present and the magnitude thereof.

12. A method as in claim 11 wherein said automatic machine integrating step comprises automatically integrating and summing within apparatus at least one of said frequency components to automatically produce a wear index value indicative of cutter wear rate.

13. A method as in claim 12 further comprising:

automatically comparing said wear index value within apparatus to a predetermined level which is sufficient to require removal and providing an output indication from said apparatus of this condition if said predetermined level is exceeded.

14. A method as in claim 13 further comprising:

automatically inhibiting said output indication from said apparatus if less than a predetermined minimum number of parts have been cut with said cutters thereby preventing possible spurious output indications.

15. A method as in claim 13 further comprising:

automatically forcing said output indication from said apparatus if more than a predetermined maximum number of parts have been cut with said cutters thereby providing a fail-safe output indication from said apparatus even though said predetermined level may not be exceeded.

16. A method as in claim 1 wherein said automatic machine processing and integrating steps are automatically performed in computing apparatus means which are time-shared by a plurality of cutting machines.

17. Apparatus for monitoring the condition of cutters on a cutting machine which is driven by a driving motor, said apparatus comprising:

means for producing a signal representative of the power being consumed by said motor during at least part of a cutting operation on said cutting machine, means for processing said signal to derive a frequency spectrum therefor, and means for integrating at least part of said frequency spectrum to produce a wear index value indicative of the condition of the cutters being used by said cutting machine.

18. Apparatus as in claim 17 further comprising:

means for substantially filtering out of said signal, all frequency components in excess of a predetermined frequency range.

19. Apparatus as in claim 18 wherein said predetermined frequency range comprises 1–50 Hz.

20. Apparatus as in claim 17 further comprising:

means for blocking the D.C. component of said signal.

21. Apparatus as in claim 17 wherein said means for producing comprises:

means for generating an analog signal representative of the power being consumed by said motor, analog-to-digital converter means connected to receive said analog signal and to produce digital signals in response thereto which are representative of the power being consumed by said motor at successive discrete time intervals during at least part of a cutting operation on said cutting machine.

22. Apparatus as in claim 21 wherein said means for processing comprises:

means for digitally computing a Fourier transform using said digital signals to provide a digitally valued frequency spectrum of the power being consumed by said motor.

23. Apparatus as in claim 22 wherein said means for integrating comprises:

means for digitally integrating said digitally valued frequency spectrum to produce a digital wear number indicative of the condition of said cutters.

24. Apparatus as in claim 23 further comprising:

means for comparing the just computed said digital wear number to at least one previously computed wear number value to detect when the cutters need removal for servicing.

25. Apparatus as in claim 24 further comprising:

means for comparing the number of parts which have been cut by said cutters to a predetermined maximum fail-safe number to indicate a need for cutter removal if said maximum number has been exceeded even though said wear number may not indicate such need.

26. Apparatus as in claim 17 wherein said means for producing comprises:

means for generating an analog signal representative of the power being consumed by said motor during at least part of a cutting operation on said cutting machine, a low pass filter connected to pass the low frequency components (approximately 1–50 Hz) of said analog signal, gate means for blocking said analog signal during other than said cutting operations if it is then being produced, and A.C. coupling means for blocking any D.C. component of said analog signal to produce an output signal representing only the significant A.C. components of variations in the power being consumed by said motor during a cutting operation on said cutting machine.

27. Apparatus as in claim 17 wherein said means for processing comprises:

means for performing a frequency analysis of said signal to determine which frequency components are present and the magnitude thereof.

28. Apparatus as in claim 27 wherein said means for integrating comprises:

means for integrating and summing said frequency components to produce a wear index value indicative of the cutter wear rate.

29. Apparatus as in claim 28 further comprising:

means for comparing said wear index value to a predetermined level which is sufficient to require removal and for providing an indication of this condition if said predetermined level is exceeded.

30. Apparatus as in claim 29 further comprising:

means for inhibiting said indication if less than a predetermined minimum number of parts have been cut with said cutters thereby preventing possible spurious indications.

31. Apparatus as in claim 29 further comprising:

means for forcing said indication if more than a predetermined maximum number of parts have been cut with said cutters thereby providing a fail-safe indication even though said predetermined level may not be exceeded.

* * * * *